(12) United States Patent
Rossi

(10) Patent No.: US 8,474,224 B2
(45) Date of Patent: Jul. 2, 2013

(54) TURNTABLE APPARATUS FOR WRAPPING MACHINE

(75) Inventor: Bruno Rossi, Rimini (IT)

(73) Assignee: Robopac S.p.A., San Marino ( * ) Notice: Subject to any disclaimer, the term of this patent is extended or adjusted under 35 U.S.C. 154(b) by 134 days.

(21) Appl. No.: 12/516,823

(22) PCT Filed: Nov. 29, 2007

(86) PCT No.: PCT/IB2007/003683
§ 371 (c)(1),
(2), (4) Date: Sep. 28, 2009

(87) PCT Pub. No.: WO2008/065519
PCT Pub. Date: Jun. 5, 2008

(65) Prior Publication Data
US 2010/0064906 A1    Mar. 18, 2010

(30) Foreign Application Priority Data
Nov. 30, 2006  (IT) .............................. MO2006A0396

(51) Int. Cl.
*B65B 11/04*  (2006.01)
(52) U.S. Cl.
USPC .................................. 53/211; 53/556; 53/587

(58) Field of Classification Search
USPC ....... 53/587, 211, 556; 108/103, 104; 100/15; 248/349.1
See application file for complete search history.

(56) References Cited

U.S. PATENT DOCUMENTS

| 4,409,776 | A | * | 10/1983 | Usui | 53/399 |
| 6,705,143 | B2 | * | 3/2004 | Liu | 72/52 |
| 2003/0126833 | A1 | * | 7/2003 | Marchetti | 53/211 |

FOREIGN PATENT DOCUMENTS

| CA | 2384008 A1 | * | 11/2003 |
| DE | 26 21 890 A1 | | 12/1976 |
| EP | 1092627 A2 | * | 4/2001 |
| EP | 1 325 866 A1 | | 7/2003 |
| GB | 889 280 A1 | | 2/1962 |

* cited by examiner

*Primary Examiner* — M. Alexandra Elve
*Assistant Examiner* — Andrew M Tecco
(74) *Attorney, Agent, or Firm* — Laubscher & Laubscher, P.C.

(57) ABSTRACT

Apparatus for a wrapping machine for wrapping a product with a film made of plastics, comprising a table which rotates around a wrapping axis and which supports the product to be wrapped, a frame provided with a plurality of supporting wheels, which are mounted free to rotate around respective rotating axes and which support the table, wherein the supporting wheels are connected to the frame so that the respective rotating axes are tiltable with respect to a supporting plane of the apparatus.

15 Claims, 5 Drawing Sheets

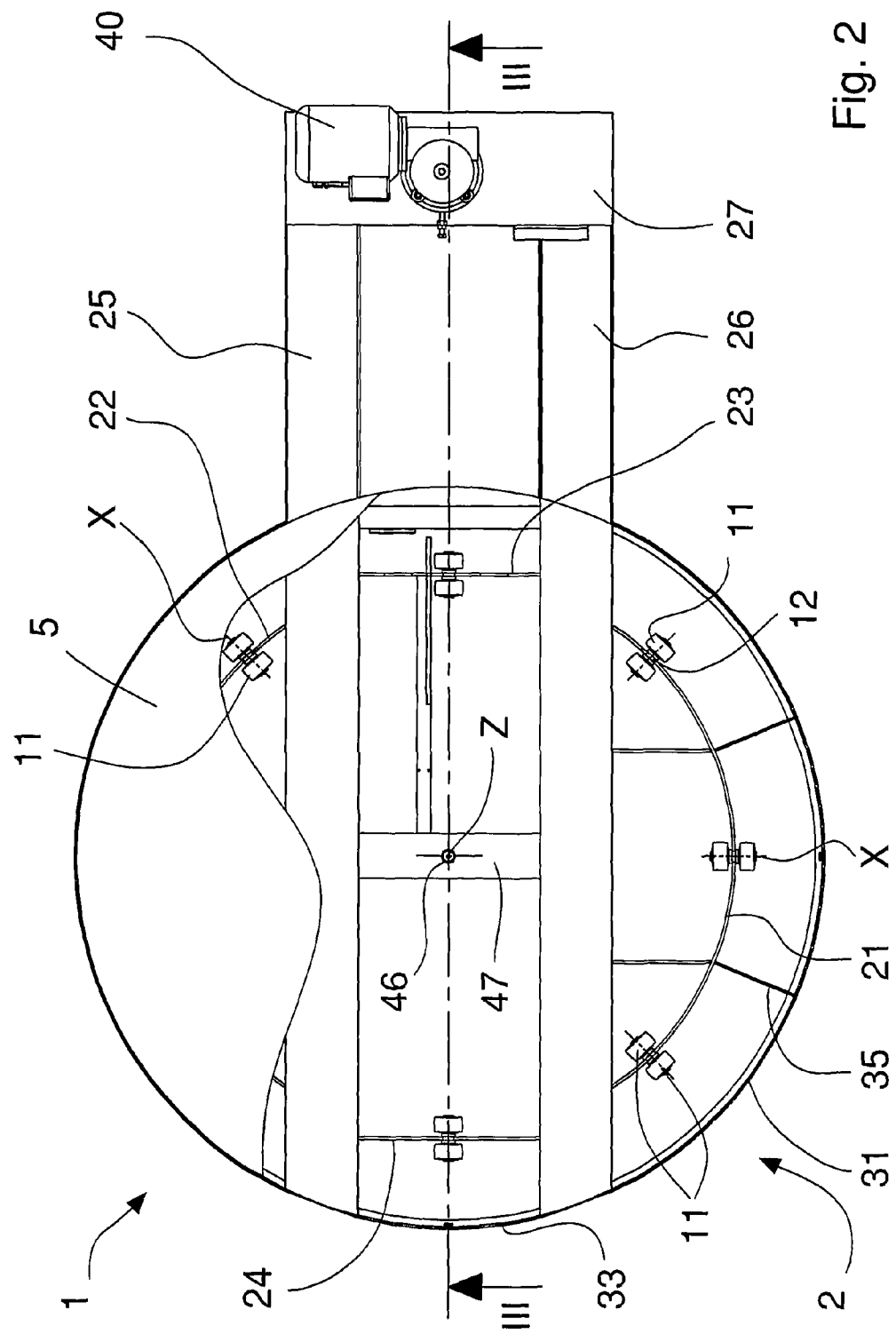

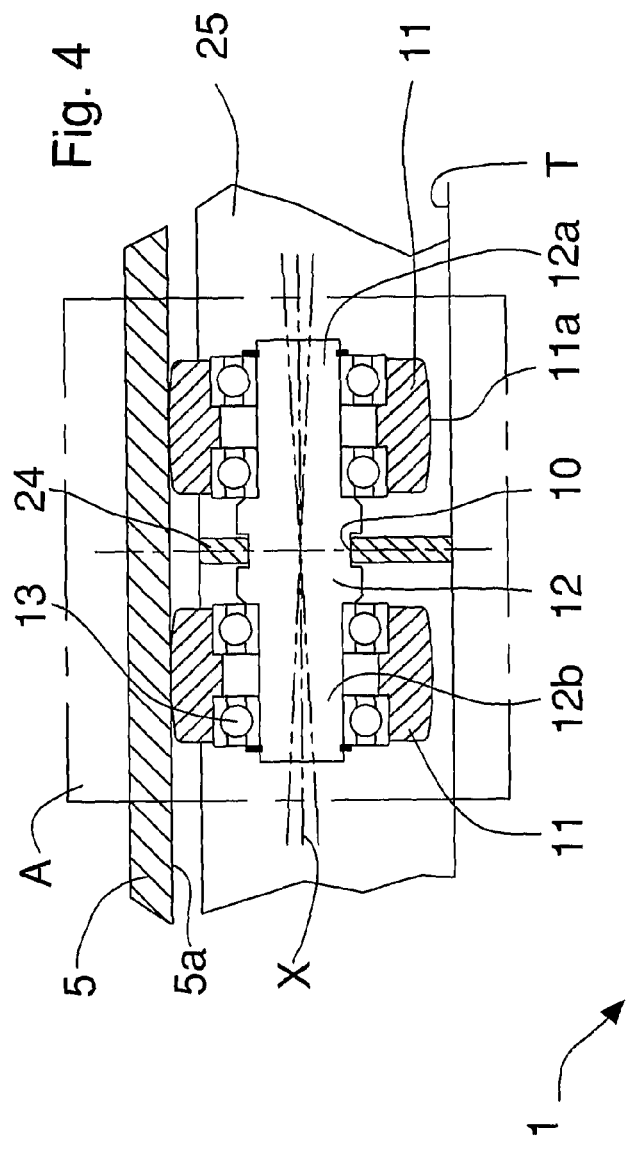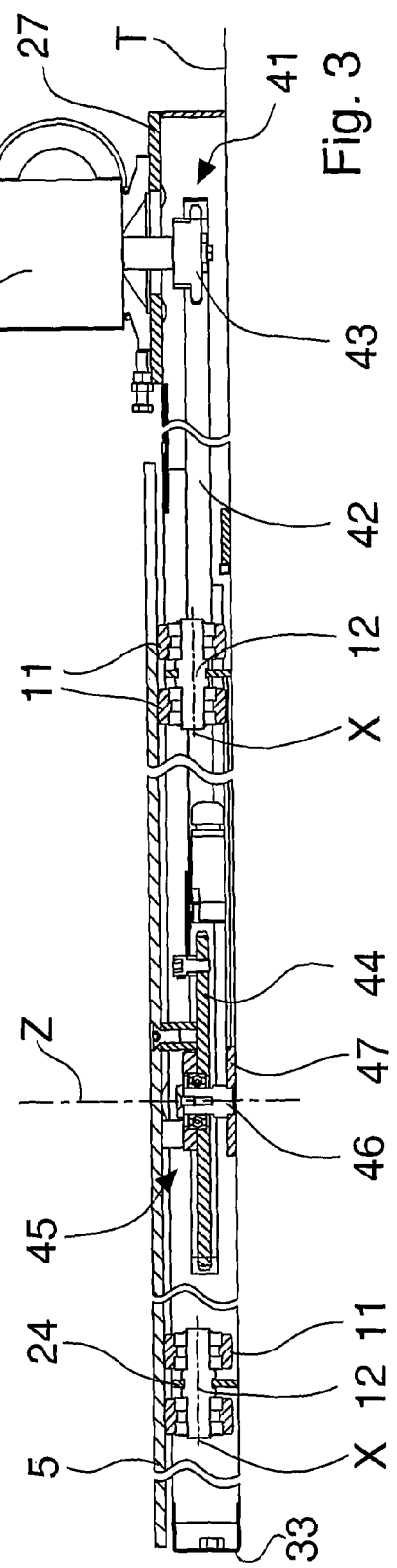

TURNTABLE APPARATUS FOR WRAPPING MACHINE

This application is a continuation of PCT International Application No. PCT/IB2007/003683 filed Nov. 29, 2007. PCT/IB2007/003683 claims priority to IT Application No. MO2006A000396 filed Nov. 30, 2006. The entire contents of this application are incorporated herein by reference.

The invention relates to a rotating table apparatus for wrapping machine, in particular for a vertical wrapping machine arranged for wrapping with a film made of cold-extendible plastics a product or a plurality of products grouped on a platform or pallet.

In rotating-table wrapping machines of known type, the product resting on the circular table is rotated around a vertical axis so as to be progressively wrapped by an extendible film made of plastics unwound from a reel, this reel being movable in a vertical direction with reciprocating motion so as to enable the aforesaid product to be bound with crossed strips or coils of film.

Such wrapping machines comprise a base frame that rotatingly supports the rotating table or platform and to which base frame is fixed a column structure that slidably supports a vertically movable reel-holding carriage. The carriage supports the reel of plastics film and, generally, a group of unwinding and prestretching rollers arranged for unwinding and elongating the film.

The base frame has a relatively reduced height (50-80 mm), to enable the product to be placed on the table in an easy manner, and has a circular shape the dimensions thereof are substantially equivalent to those of the table. The frame comprises a central pin that rotatingly supports a coupling element to which the table is removably fixed. The coupling element and the table are rotated around the central pin by a motor through a belt or a chain.

The base frame further comprises a plurality of rollers or supporting wheels, arranged regularly distributed and spaced from one another, so as to abut on a lower surface of the table so as to support the weight of the table and of the product weighing thereupon. Generally, the wheels are radially distributed, fixed to elongated or profiled elements of the base frame arranged radially from the central pin.

Each wheel is mounted idle on a respective supporting pin that engages a corresponding seat obtained in the profiled elements of the frame. The seat is shaped so as to support both the ends of the supporting pin, the wheel being fixed at the middle of the supporting pin.

In some wrapping machines, the wheels are fixed in a cantilevered manner, by respective pins, to one or more substantially circular shaped profiled elements of the base frame.

The number and the distribution of the wheels on the base frame must be such as to ensure a uniform and balanced distribution of the weight of the table and product, the product being able to reach in this type of machine values up to 2000 kg. Correct distribution of the supporting wheels is particularly important for preventing deformation and structural failures of the rotating table that, for reasons of cost and lightness, generally consists of a circular sheet metal having reduced thickness.

A drawback of known rotating tables consists of the fact that only a limited number of wheels actually supports the weight of the table and of the corresponding load, most wheels not succeeding in coming into contact with the lower surface of the table, thus remaining substantially inactive and unused. This is generally due to imprecisions and errors in the manufacturing and mounting step, which do not enable the wheels to be arranged so as to be coplanar with one another.

In addition to that, the table may not be flat following errors or defects in the construction step, or because of deformations that have occurred during use.

Following such drawbacks and defects, during operation of the wrapping machine, the table comes into contact, at each rotation, only with some supporting wheels, which are therefore particularly stressed as they support the entire load.

Vibrations and noises arise therefrom during operation that are due to the discontinuous and irregular contact of the table with the wheels and, therefore, structural mechanical stresses and localized wear occur that require components, in particular wheels and pins, to be replaced frequently, and may sometimes cause the breakage thereof, with consequent stop of the wrapping machine and an increase in running and maintenance costs.

An object of the invention is to improve known rotating table apparatuses for wrapping machines for wrapping a product with an extendible film made of plastics.

Another object is to make a rotating table apparatus that is able to support a product to be wrapped in an optimal manner, dividing uniformly and regularly the weight of the product on a frame and supporting wheels, so as to obtain operation that is silent and substantially absent from anomalous and irregular mechanical vibrations and/or stresses.

A further object is to obtain a simple and cheap apparatus to make that at the same time has a robust and reliable structure.

Apparatus for a wrapping machine (50) for wrapping a product (100) with a film (101) made of plastics, comprising table means (5) which rotates around a wrapping axis (Z) and which supports said product to be wrapped (100), frame means (2) provided with a plurality of supporting wheels (11), which are mounted free to rotate around respective rotating axes (X) and which support said table means (5), characterised in that said supporting wheels (11) are connected to said frame means (2) so that said respective rotating axes (X) are tiltable with respect to a supporting plane (T) of said apparatus (1).

Owing to the invention it is thus possible to make a rotating table apparatus for a wrapping machine that is able to support in an optimal manner the weight of the table and of a product to be wrapped. The supporting wheels, being tiltable with respect to a horizontal supporting plane, thus enable said weight to be divided in a uniform and regular manner on the frame means. In particular, the supporting wheels are fixed in pairs to respective supporting pins, each of which is housed in a respective seat of the frame so as to be tiltable with respect to said horizontal supporting plane. In this way, during operation, each pin can be tilted, so as to enable both the respective wheels to abut on the table below. This enables the weight of the product to be divided in a uniform and balanced manner on all the supporting pins and, at the same time, this enables a constant contact between wheels and table to be ensured that eliminates or considerably reduces vibrations and noise during operation.

The invention can be better understood and implemented with reference to the attached drawings that illustrate some embodiments thereof by way of non-limitative embodiments, in which:

FIG. 2 is a schematic top view of the apparatus in FIG. 1;

FIG. 3 is a partial and fragmentary section according to the line III-III in FIG. 2;

FIG. 4 is an enlarged view of a detail of the section in FIG. 3, highlighting supporting wheels of the table connected to a frame;

Figure 1:
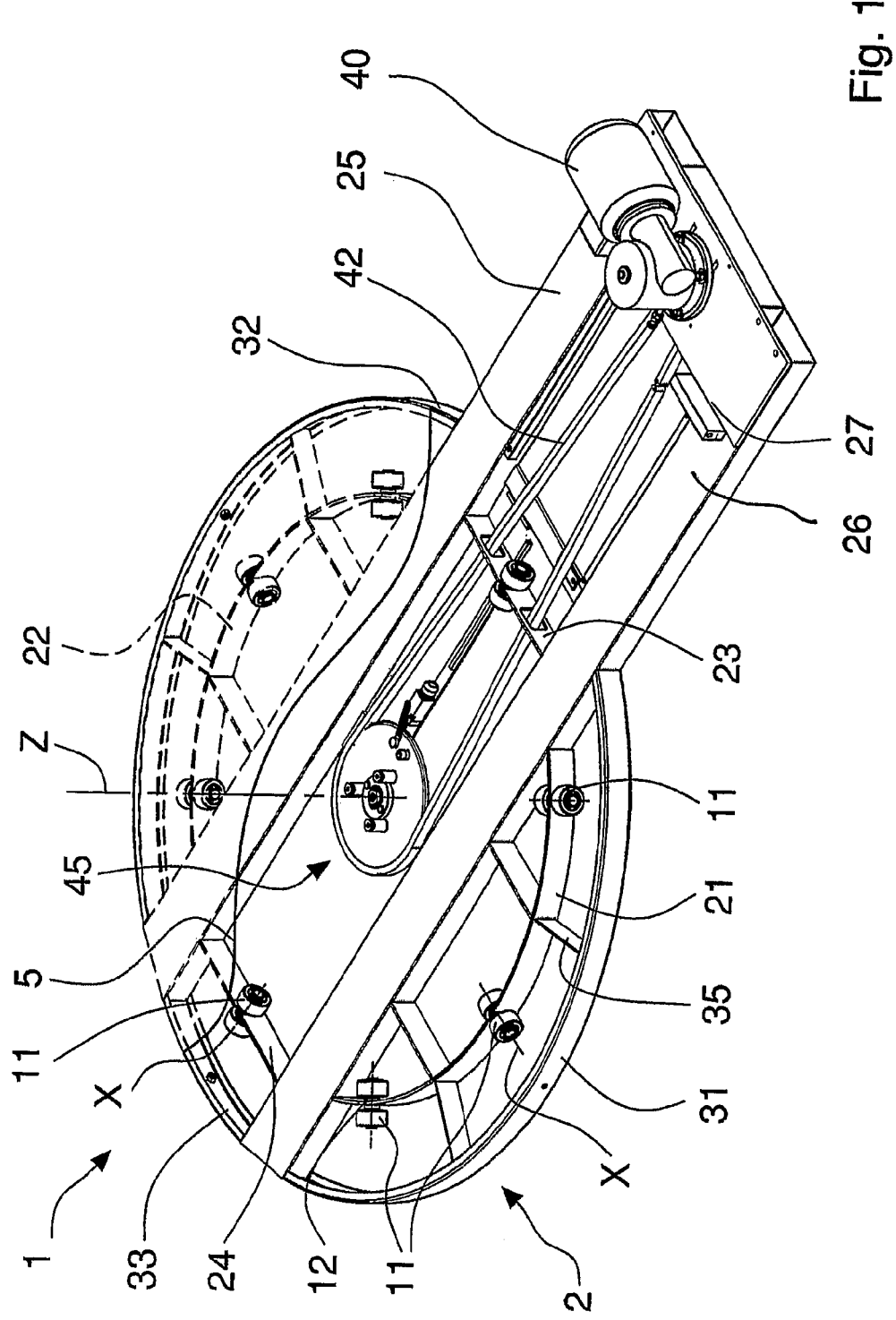
FIG. 1 is a perspective view of the apparatus of the invention, in which a table is partially shown.
Figure 7:
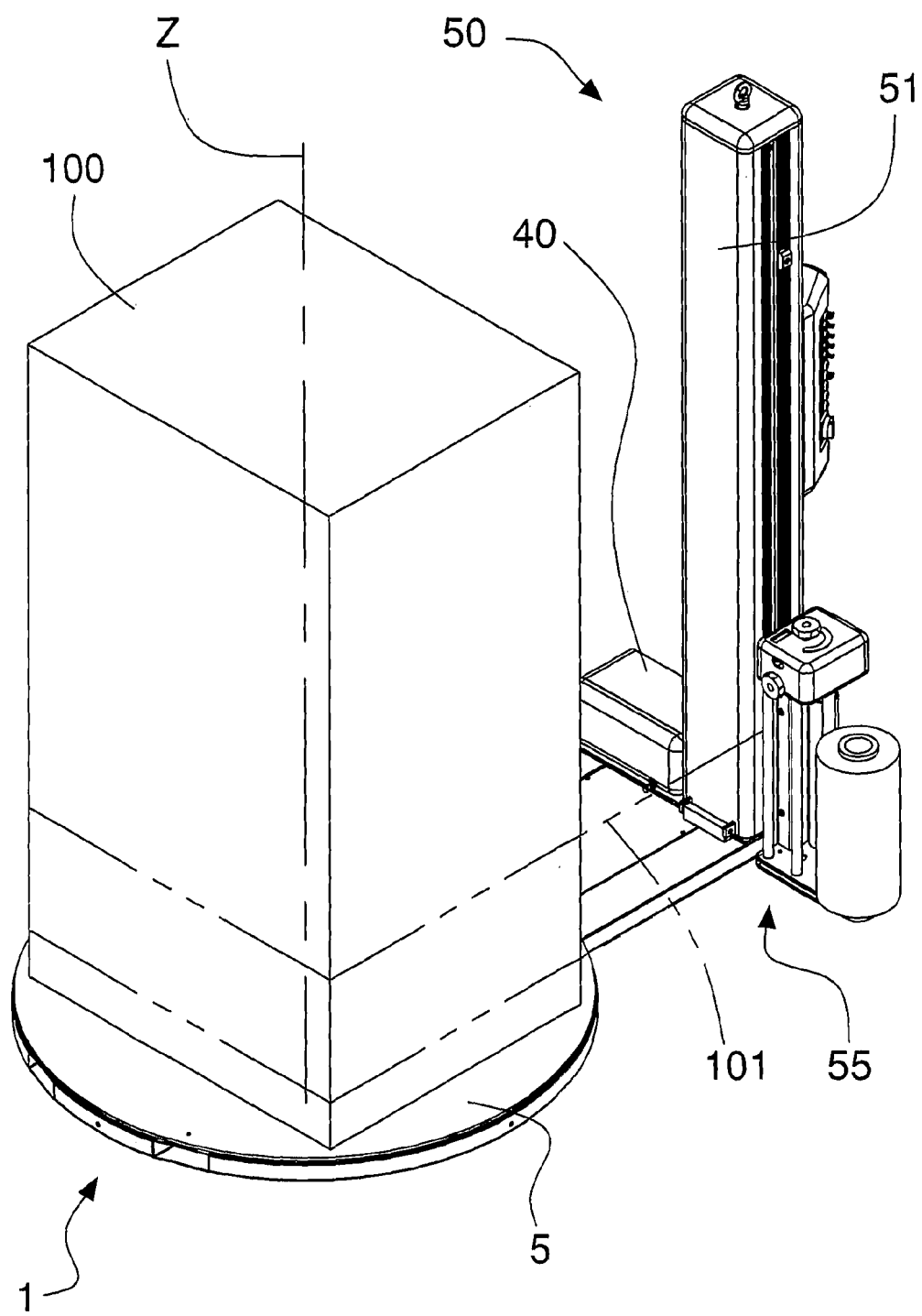
FIG. 7 shows a perspective schematic view of a vertical wrapping machine provided with the rotating table apparatus in FIG. 1.

With reference to FIGS. 1, 2 and 7, there is shown a rotating table apparatus 1 for a wrapping machine 50 suitable for wrapping with a film 101 made of plastics a product 100 supported and rotated around an almost vertical wrapping axis Z.

The apparatus 1 comprises a frame 2 arranged for rotatably supporting around said axis Z a table 5, which table 5 has a substantially circular shape and is arranged for receiving the product 100 to be wrapped. The table 5 includes, for example a circular plate of sheet metal.

With reference to FIGS. 2 to 5, the frame 2 comprises a plurality of shaped and/or rectilinear elements, that are suitably fixed together, for example by means of welding, so as to form a stiff reticular structure having almost the same shape as the table 5.

The apparatus comprises a plurality of supporting wheels 11 that are mounted on the frame 2 and are free to rotate around respective rotating axes X and are arranged to abut on a lower surface 5a of said table 5, so as to support the weight of this table 5 and of a product 100 positioned thereupon.

The supporting wheels 11 are connected to the frame 2 in such a manner that the respective rotating axes X are tiltable with respect to a supporting plane T of said apparatus 1. The supporting plane T is, for example, the horizontal ground plane, with respect to which the wrapping axis Z is almost orthogonal.

The supporting wheels 11 are mounted on pairs on respective supporting pins 12, so that the rotating axes X of each pair of wheels substantially coincide with the longitudinal axes of the respective supporting pins 12.

The wheels 11 of each pair are mounted free to rotate on opposite ends 12a, 12b of a respective supporting pin 12, for example through the interposing of rolling bearings 13.

The external surface 11a of each wheel 11 is almost spherical in order to adapt better to the lower surface 5a of the table 5 (FIG. 4).

The wheels 11 may be made of plastics and/or synthetic material with a low friction coefficient, for example acetalic resin containing glass fibre.

The frame 2 comprises a plurality of seats 10, each of which is arranged for receiving a respective supporting pin 12 and a corresponding pair of wheels 11. The seats 10 are suitably spaced from one another and are positioned below the table 5 to ensure a homogenous and uniform distribution of the load on all the pairs of wheels 11.

In particular, the seats 10, for example eight in number, are made angularly spaced on a resting arrangement 21, 22, 23, 24 of the frame, said resting arrangement comprising a plurality of flat elements 21, 22, 23, 24 connected together to form a closed loop with a substantially circular shape.

On the flat elements 21, 22, 23, 24 is provided to make a number of seats 10 that is greater than the number of the pairs of wheels necessary for supporting the table 5. In this way, in the event of unexpected wear of one or more seats 10, the supporting wheels 11 and the corresponding pins 12 can be moved to integral adjacent seats.

Each seat 10 comprises a U-shaped slot that is open above, arranged for receiving an annular groove 12c made on each supporting pin 12, at the middle thereof, that is equidistant from the opposite ends 12a, 12b.

Figure 5:
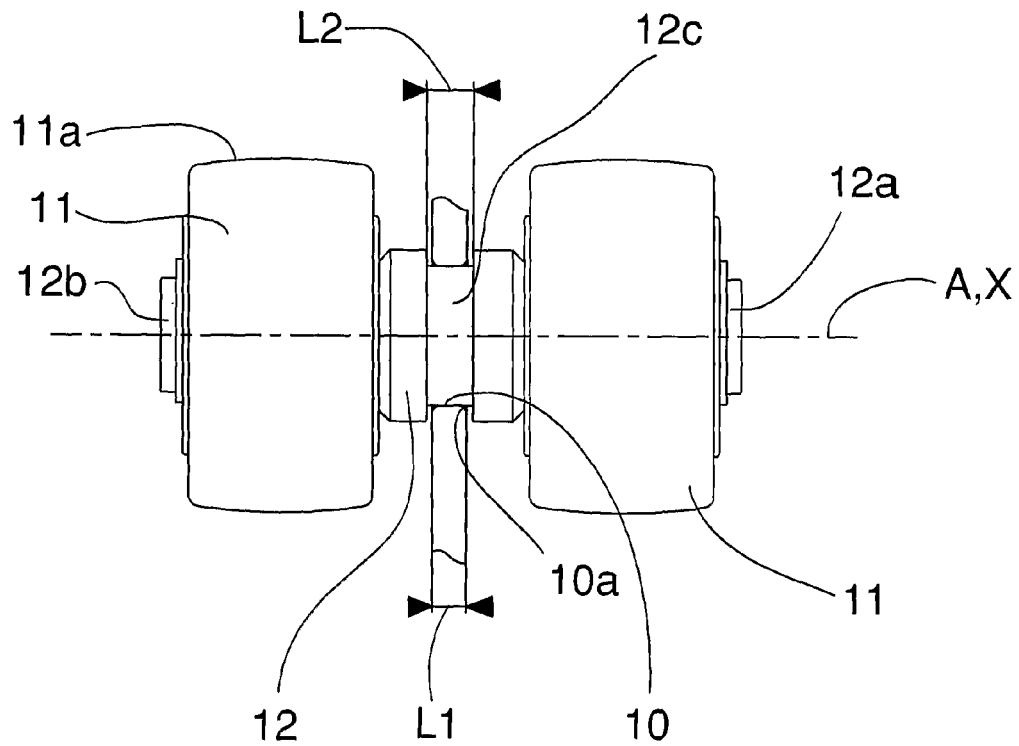
FIG. 5 is an enlarged partial top view of the apparatus in FIG. 2, showing supporting wheels connected to the frame.

The seat 10 has a length L1, equal to the thickness of the flat elements 21, 22, 23, 24, which is lower, for example by a quantity comprised between 0.5 and 2 mm, than a width L2 of the annular groove 12c of the corresponding supporting pin 12 (FIG. 5). In this way, said supporting pin is able to tilt, for example by an angle comprised between 1° and 10°, with respect to the supporting plane T of said apparatus 1. In this way, the supporting pin 12 is able to perform oscillations of limited size on a inclination plane A which is almost parallel to the wrapping axis Z and is almost orthogonal to said supporting plane T. FIG. 4 shows a rotating axis X of the supporting wheels 11, coinciding with the longitudinal axis of the supporting pin 12, in a position parallel to the supporting plane T and in two opposite tilted positions.

The seat 10 can be provided with peripheral edges 10a with a rounded shape for facilitating the movement of the supporting pin 12.

Figure 6:
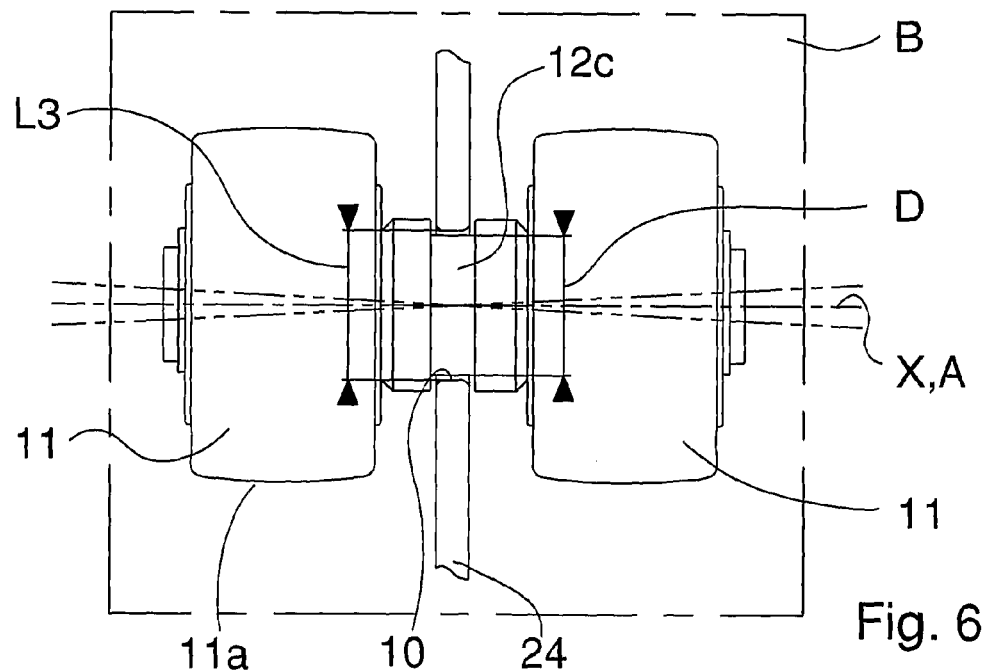
FIG. 6 shows a version of the apparatus of the invention.

FIG. 6 shows an embodiment of the apparatus 1, in which it is provided that each seat 10 has a width L3 greater than an external diameter D of the annular groove 12 of the corresponding supporting pin 12, so that the supporting pin 12 can tilt with respect to the inclination plane A, that is perform oscillations of limited size on a further inclination plane B which is almost orthogonal to the wrapping axis Z and which is almost parallel to said supporting plane T.

In a further embodiment of the apparatus, that is not shown, there is provided a supporting device that includes joints or ball joints interposed between the resting pins 12 and the seats 10 of the resting arrangement 21, 22, 23, 24 to enable said pins to be tilted.

The resting arrangement comprises two curved flat elements 21, 22 and two rectilinear flat elements 23, 24 connected together with the interposition of two longitudinal members or longitudinal profiled sections 25, 26 of said frame 2.

Alternatively, the resting arrangement may include a single annular flat element, for example an annular calendered plate, provided with seats 10.

The longitudinal members 25, 26, parallel to one another and spaced from one another, extend radially with respect to the resting arrangement 21, 22, 23, 24 to support at a free end thereof a plate 27 to which an actuating device 40 and a column 51 are fixed, respectively for rotating the table 5 and for slidingly supporting a reel-holding carriage 55 of the wrapping machine 50.

In particular, the actuating device 40, which for example comprises a rotating electric motor with speed reducer, is arranged for rotating, by a transmitting element 41, a joining element 45. Said joining element 45 is rotatingly supported by the frame 2 and is suitable for being removably coupled, for example by screws or bolts, to the table 5.

The transmitting element 41 comprises, for example, a toothed chain or belt 42 wound in a closed loop on a pinion 43, which is fixed to a driving shaft of the actuating device 40, and to a gear wheel or pulley 44 fixed to, or made on, the joining element 45.

The joining element 45 is rotatingly coupled, for example through the interposition of rolling bearings, to a central supporting pin 46 of the frame 2. The central supporting pin 46, almost coaxial to the wrapping axis Z, is fixed to a central plate 47 that connects the two longitudinal members 25, 26.

The frame 2 further comprises a further resting arrangement 31, 32, 33, that includes, for example, a plurality of profiled elements with a "C" section, bounding an area occupied by the table 5. Said further resting arrangement 31, 32, 33 is connected to the longitudinal members 25, 26 and to the flat elements 21, 22, 23, 24 by connecting elements 35.

The shape and the structure of the frame 2, i.e. of the resting arrangement 21, 22, 23, 24, of the longitudinal members 25, 26 and of the further resting arrangement 31, 32, 33, may change according to the dimensions of the apparatus, the material used for the construction, the dimension and weight of the products 100 to be wrapped, the rotation speed, etc.

During operation of the rotating-table apparatus 1, as each resting pin 12 is free to tilt in the seat 10 thereof, the corresponding pair of wheels 11 is orientatable and can be arranged so that both the corresponding wheels 11 abut on the lower surface 5a of the table 5. This enables it to be avoided that only a reduced number of supporting wheels 11 operates effectively because of possible imprecisions in the construction and/or the mounting of the apparatus and/or deformations of the table.

As at each seat 10 both the wheels 11 support the table 5, the weight of the table 5 and of the product 100 can be divided in a substantially uniform and balanced manner on all the supporting pins 12, which are not thus mechanically stressed in an anomalous manner. Further to this, between the wheels 11 and the lower surface 5a of the table 5, constant contact is ensured that eliminates or considerably reduces vibrations and noise during operation, even at high rotation speed. The regular operation enables the duration of the apparatus to be increased and maintenance interventions to be reduced.

The invention claimed is:

1. Apparatus for a wrapping machine for wrapping a product with a film made of plastics, comprising a table which rotates around a wrapping axis and which supports said product to be wrapped, a frame provided with a plurality of supporting wheels, which are mounted free to rotate around respective rotating axes and which support said table, said supporting wheels being connected to said frame by respective supporting pins, so that said rotating axes coincide with longitudinal axes of said supporting pins, wherein
said supporting wheels are connected to said frame via said supporting pins so that said longitudinal axes of said supporting pins and coinciding respective rotating axes of said supporting wheels are tiltable with respect to a supporting plane of said apparatus;
each supporting pin rotatingly supports a pair of supporting wheels, said supporting wheels being connected to respective ends of said supporting pin; and
said frame comprises a plurality of seats suitable for receiving said supporting pins, each seat comprising an open slot configured so as to house an annular groove of a respective supporting pin, said annular groove being equidistant from said ends of said supporting pin, each seat having a length that is less than a width of said annular groove to enable the respective supporting pin to be tilted with respect to said supporting plane.

2. Apparatus according to claim 1, wherein each seat has peripheral edges with a rounded shape.

3. Apparatus according to claim 1, wherein said seats are angularly spaced from one another with respect to said wrapping axis.

4. Apparatus according to claim 1, wherein said seats are made on a resting arrangement of said frame.

5. Apparatus according to claim 4, wherein said resting arrangement has a substantially annular shape.

6. Apparatus according to claim 4, wherein said resting arrangement comprises a plurality of curved and/or rectilinear flat elongated elements that are connected to one another.

7. Apparatus according to claim 4, wherein said resting arrangement comprises an annular shaped flat elongated element.

8. Apparatus according to claim 7, wherein said annular shaped flat elongated element is a calendared flat element.

9. Apparatus according to claim 4, wherein said frame further comprises a longitudinal member, fixed to said resting arrangement and supporting an actuating device arranged for rotating said table.

10. Apparatus according to claim 9, comprising a transmitting element interposed between said actuating device and a joining element rotatingly supported by said frame and connected to said table.

11. Apparatus according to claim 1, wherein each supporting wheel comprises a peripheral surface for contacting the table, said peripheral surface having a partially spherical shape.

12. Wrapping machine for wrapping a product with a film made of plastics, comprising a rotating table apparatus according to claim 1.

13. Apparatus according to claim 1, wherein said open slot is a U-shaped slot.

14. Apparatus according to claim 1, wherein said respective rotating axes are tiltable through an angle between 1° and 10°.

15. Apparatus for a wrapping machine for wrapping a product with a film made of plastics, comprising a table which rotates around a wrapping axis and which supports said product to be wrapped, a frame provided with a plurality of supporting wheels, which are mounted free to rotate around respective rotating axes and which support said table, said supporting wheels being connected to said frame by respective supporting pins, so that said rotating axes coincide with longitudinal axes of said supporting pins, wherein
said supporting wheels are connected to said frame via said supporting pins so that said longitudinal axes of said supporting pins and coinciding respective rotating axes of said supporting wheels are tiltable with respect to a supporting plane of said apparatus;
each supporting pin rotatingly supports a pair of supporting wheels, said supporting wheels being connected to respective ends of said supporting pin; and
said frame comprises a plurality of seats suitable for receiving said supporting pins, each seat comprising an open slot configured so as to house an annular groove of a respective supporting pin, said annular groove being equidistant from said ends of said supporting pin, each seat having a length that is less than a width of said annular groove to enable the respective supporting pin to be tilted with respect to said supporting plane, and each seat having a width that is greater than a diameter of said annular groove to enable the respective supporting pin to be tilted with respect to an inclination plane which is parallel to said wrapping axis and is orthogonal to said supporting plane.

* * * * *